(12) United States Patent
Yang et al.

(10) Patent No.: US 8,285,007 B2
(45) Date of Patent: Oct. 9, 2012

(54) SUBWINDOW SETTING METHOD FOR FACE DETECTOR

(75) Inventors: Hyun Seung Yang, Daejeon (KR); Yeong Nam Chae, Daejeon (KR); Ji Nyun Chung, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 987 days.

(21) Appl. No.: 12/324,770

(22) Filed: Nov. 26, 2008

(65) Prior Publication Data

US 2009/0196506 A1   Aug. 6, 2009

(30) Foreign Application Priority Data

Feb. 4, 2008  (KR) .................. 10-2008-0011163

(51) Int. Cl.
*G06K 9/00* (2006.01)
(52) U.S. Cl. ........................ 382/118; 382/165
(58) Field of Classification Search ............ 382/118, 382/165

See application file for complete search history.

(56) References Cited

U.S. PATENT DOCUMENTS

| 7,039,229 B2 * | 5/2006 | Lin et al. ................. 382/165 |
| 7,738,680 B1 * | 6/2010 | Bourdev ................. 382/103 |
| 7,881,528 B2 * | 2/2011 | Terakawa ................. 382/165 |
| 2002/0102024 A1 * | 8/2002 | Jones et al. .............. 382/225 |
| 2006/0198554 A1 * | 9/2006 | Porter et al. ............. 382/159 |
| 2008/0074529 A1 * | 3/2008 | Terashima ................ 348/345 |
| 2008/0137957 A1 * | 6/2008 | Xu et al. ................. 382/190 |

FOREIGN PATENT DOCUMENTS

KR           100755800         8/2007

OTHER PUBLICATIONS

Phung et al. "A Color-Based Approach to Automatic Face Detection." Proceedings of the 3rd IEEE International Symposium on Signal Processing and Information Technology, Dec. 14, 2003, pp. 531-534.*
Han et al. "Real-Time Face Detection Using AdaBoot Algorithm." International Conference on Control, Automation and Systems, Oct. 14, 2008, pp. 1892-1895.*
Paul Viola and Michael Jones, "Rapid object detection using a boosted cascade of simple features." In Proc. of IEEE Computer Society Conference on Computer Vision and Pattern Recognition, Kauai, Hawaii, Dec. 14, 2001.

* cited by examiner

*Primary Examiner* — Jon Chang
(74) *Attorney, Agent, or Firm* — Kevin D. Jablonski; Graybeal Jackson LLP

(57) ABSTRACT

Disclosed herein is a subwindow setting method for a face detector for detecting whether one or more facial images exist in each of subwindows having a set size while sequentially setting the subwindows in the width direction of an input image. A scan interval between two neighboring subwindows under consideration in the width direction is determined based on the facial color density of a first subwindow of the two neighboring subwindows. Further, a scan interval between the first and second rows in a height direction of the input image is determined based on the facial color density of the subwindows included in the first row.

8 Claims, 3 Drawing Sheets

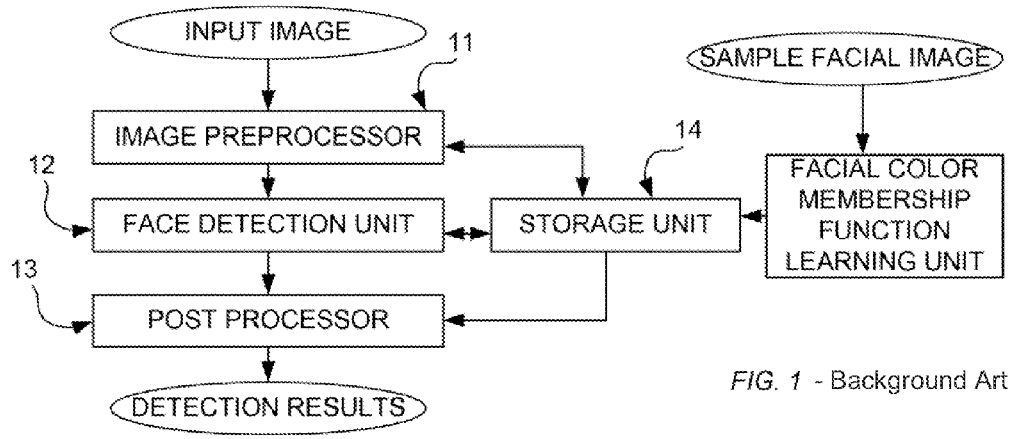
*FIG. 1* - Background Art
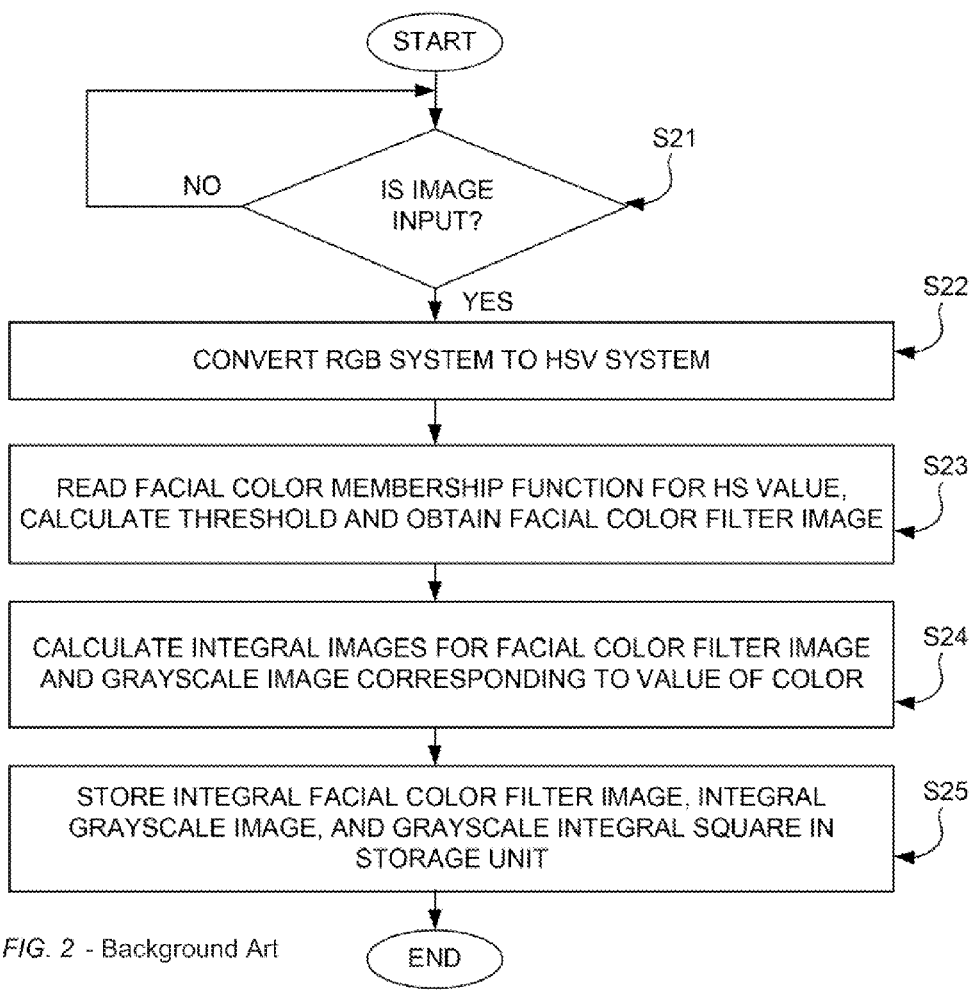
*FIG. 2* - Background Art

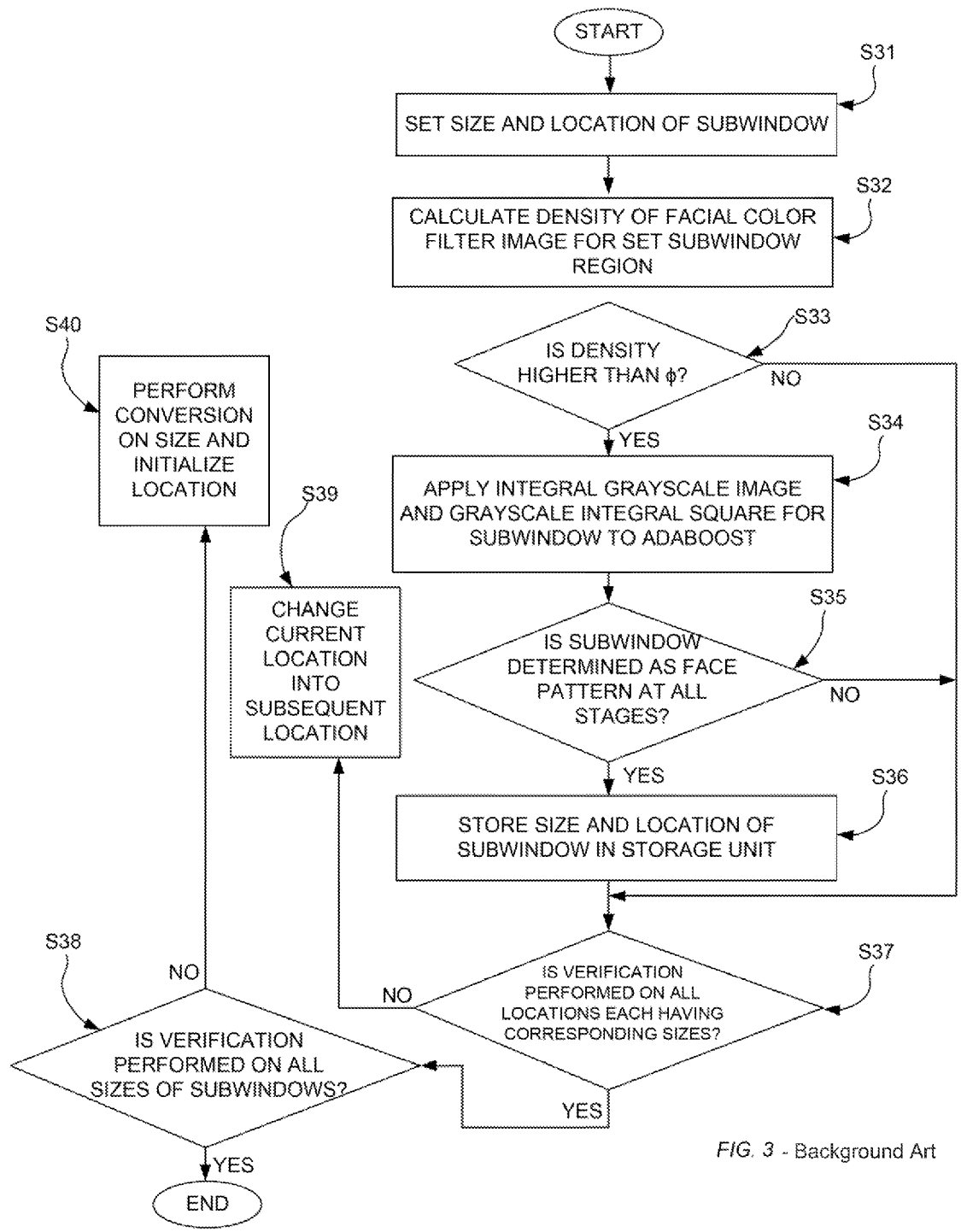
FIG. 3 - Background Art

SUBWINDOW SETTING METHOD FOR FACE DETECTOR

PRIORITY CLAIM

The present application claims the benefit of Korean Patent Application Serial No.: 10-2008-0011163, filed Feb. 4, 2008, which application is incorporated herein by reference in its entirety.

BACKGROUND

1. Technical Field

The present subject matter relates generally to a technology for detecting one or more facial images from an input image, and, more particularly, to a subwindow setting method of detecting one or more face image candidate regions for a face detector for detecting one or more face regions by detecting the face image candidate regions using facial colors and then applying Adaboost for the detected face image candidate regions.

2. Description of the Related Art

Technologies for detecting face regions from images have mainly been aimed at detecting face regions from grayscale images, and have reached a level which can be put to practical use at present. That is, since unique characteristics for defining faces can be sufficiently obtained through grayscale images, facial color information is not inevitably required to be used. However, the inventor of the present invention determined that face regions can be more accurately and quickly detected using a small computational load if facial color information is used when the face regions are detected from images, so that the inventor proposed a method of efficiently using facial color information in a process for detecting face regions.

Korean Patent No. 755800 was applied for by the applicant of the present invention on Jun. 21, 2006 and was registered on Sep. 30, 2007. The invention is entitled "Face Detector using Facial Colors and Adaboost and Detecting Method thereof". The invention, disclosed in Korean Patent No. 755800, is as follows.

FIG. 1 is a block diagram showing the configuration of a face detector using facial color and Adaboost according to the patent invention disclosed in Korean Patent No. 755800.

The face detector includes an image preprocessor 11, a face detection unit 12, a post-processor 13, a storage unit 14, and a facial color membership function learning unit 15.

The image preprocessor 11 converts the Red-Green-Blue (RGB) system of an input image into a Hue-Saturation-Value (HSV) system, obtains a facial color filter image, from which skin color regions are extracted, using an HS value, obtains a grayscale image from a V value, and then stores the obtained images in the storage unit 14. The image preprocessor 11 respectively integrates the obtained facial color filter image with the grayscale image, obtains an integral facial color filter image and an integral grayscale image, and then stores the obtained images in the storage unit 14. If the integral facial color filter image and the integral grayscale image are used, faster operation of the face detection unit 12 can be attained.

The face detection unit 12 sets a subwindow having an arbitrary size and a location, and then detects the existence of a facial image and a non-facial image for the corresponding subwindow based on a facial color filter image and a grayscale image corresponding to the subwindow. If the corresponding subwindow is determined to be a facial image, information about the location and size of the corresponding subwindow is stored in the storage unit 14. The face detection unit 12 sets a subwindow having a minimum size (for example, 20×20 pixels), detects the existence of a facial image and a non-facial image for the corresponding subwindow while scanning throughout a screen from a upper left portion to a lower right portion. Thereafter, the face detection unit 12 changes the size of the subwindow, and then repeats the detection of the existence of a facial image and a non-facial image for the corresponding subwindow while scanning throughout the screen from the upper left portion to the lower right portion.

The post-processor 13 integrates overlapped locations for results, determined as face images by the face detection unit 12, or performs a process of verifying the results using requirements, and then outputs the verified results to an output unit or stores the verified results in the storage unit 14.

The facial color membership function learning unit 15 learns a facial color membership function for each hue based on a plurality of sample images of faces. The facial color membership function for each hue may be previously learned and then supplied to a user in the state of being stored in the storage unit 14. In this case, the facial color membership function learning unit 15 may be omitted.

FIG. 2 is a flowchart showing the operation of the image preprocessor.

When an input image is input at step S21, the Red, Green, and Blue (RGB) system of the input image is converted into an HSV system at step S22. Further, the facial color membership function $M(h(x,y), s(x,y))$ for the hue value $h(x,y)$ and saturation value $s(x,y)$ of each pixel is calculated using the facial color membership function for each hue stored in the storage unit, and then a threshold is calculated for the calculation results, thereby obtaining a facial color filter image $I_f(x,y)$ as shown in the following Equation 1 at step S23.

$$I_f(x, y) = \begin{cases} 1 & \text{if } M(h(x, y), s(x, y)) \geq \theta \\ 0 & \text{otherwise} \end{cases} \quad (1)$$

Next, integral operations are performed on the facial color filter image $I_f(x,y)$ and the grayscale image of the value of color $v(x,y)$ as shown in Equation 2, so that an integral facial color filter image $I_{if}(x,y)$, an integral grayscale image $L_{int}(x,y)$, and a grayscale integral square $L_{int}^2(x,y)$ are calculated at step S24.

$$I_{if}(x, y) = \sum_{x' \leq x, y' \leq y} I_f(x', y') \quad (2)$$

$$L_{int}(x, y) = \sum_{x' \leq x, y' \leq y} L(x', y')$$

$$L_{int}^2(x, y) = \sum_{x' \leq x, y' \leq y} L(x', y') \cdot L(x', y')$$

Further, the calculated integral facial color filter image $I_{if}(x,y)$, the integral grayscale image $L_{int}(x,y)$, and the grayscale integral square $L_{int}^2(x,y)$ are stored in the storage unit at step S25.

FIG. 3 is a flowchart showing the operation of the face detection unit.

First, the size and location of a subwindow, which is a target of face detection, are initialized at step S31. In the case in which the coordinate of the upper left point of the subwindow is $(x_{tl}, y_{tl})$ and the coordinate of the lower right point of the subwindow is $(x_{br}, y_{br})$, the density of the facial color filter image is calculated using an integral facial color filter image $I_{if}(x,y)$ as shown in the following Equation 3 at step S32.

$$\text{density} = \frac{I_{if}(x_{br}, y_{br}) - I_{if}(x_{br}, y_{tl} - 1) - I_{if}(x_{tl} - 1, y_{br}) + I_{if}(x_{tl} - 1, y_{tl} - 1)}{(x_{br} - x_{tl} + 1) \times (y_{br} - y_{tl} + 1)} \quad (3)$$

If the density calculated at step S32 is higher than a predetermined threshold Φ at step S33, the corresponding subwindow is regarded as a face image candidate, and the process proceeds to the next step such that an integral grayscale image and a grayscale integral square for the subwindow are applied to Adaboost at step S34. Meanwhile, if the density calculated at step S32 is not higher than the predetermined threshold Φ at step S33, it is determined that face detection for the corresponding subwindow is not necessary anymore and then the process proceeds to step S37.

A cascade face detection module, which performed learning using Adaboost, determines whether the subwindow, which is regarded as the face image candidate at step S33, corresponds to a facial image at step S34. In this process, the integral grayscale image $L_{int}(x,y)$ and the grayscale integral square $L_{int}^2(x,y)$ are used.

The Adaboost face detection module includes a plurality of stages, and each stage is a strong classifier learned using an Adaboost algorithm. Each strong classifier determines whether the corresponding subwindow corresponds to a facial image using an integral grayscale image $L_{int}(x,y)$ and a grayscale integral square $L_{int}^2(x,y)$. The strong classifiers at the respective stages sequentially verify whether the subwindow corresponds to a facial image and then, if the corresponding subwindow is determined as a face pattern by strong classifiers at all of the stages at step S35, the corresponding subwindow is determined as a face region and the size and location of the subwindow are stored in the storage unit at step S36. However, if the corresponding subwindow is determined not to be a facial image at any one of stages of the Adaboost face detection module at step S35, it is determined that there is no need to perform face verification on the corresponding subwindow, and the process proceeds to step S37.

The Adaboost detection module and the cascade face detection process are described in detail in reference [P. Viola and M. Jones, "Rapid object detection using a boosted cascade of simple features." In Proc. of IEEE Computer Society Conference on Computer Vision and Pattern Recognition, Kauai, Hi., 12-14, 2001].

At step S37, if the face verification is performed on subwindows, each having a corresponding size, at all the locations, and if the face verification is performed on all the sizes of subwindows at step S38, the process is terminated.

Meanwhile, if the face verification is not performed on subwindows, each having a corresponding size, at all the locations at step S37, the current location is changed to a subsequent location at step S39, and the process proceeds to step S32. Further, if the face verification is not performed on all the sizes of subwindows, conversion is performed on a size for a subsequent subwindow and the location of the subsequent subwindow is initialized at step S39, and the process proceeds to step S32.

Next, the post-processor 13 integrates overlapped subwindows based on the face detection results detected by the face detection unit, or removes one or more specific subwindows from the detection results based on one or more additional requirements (for example, requirements for the location of a face image within an image and the minimum number of overlapped subwindows) which may be applied depending on application fields. The information about the sizes and locations of the respective detected subwindows is directly provided to a user, or provided to at least one subsequent module, such as a face recognition module, which requires the location and size of a face image afterwards.

As described above, when the face detection unit sets subwindows, the patent invention disclosed in Korean Patent No. 755800 sets subwindows, each having an arbitrary size, and then detects the existence of one or more facial images and non-facial images for the subwindows located at all locations while sequentially setting the subwindows throughout a screen from an upper left portion to a lower right portion. Therefore, since this patent invention sets one or more subwindows even for unnecessary regions that definitely correspond to non-facial images and then detects the existence of one or more facial images and non-facial images for the set subwindows, the conventional system may have a problem in that excessive computational load increases when one or more facial regions are detected from an input image.

SUMMARY

Accordingly, the following has been made keeping in mind the above problems disclosed in Korean Patent No. 755800, and an object is to provide a subwindow setting method for a face detector which can reduce excessive computational load by setting no subwindow for a region that definitely corresponds to a non-facial image using facial color density information.

In order to accomplish the above object, various embodiments of the subject discussed herein provide a subwindow setting method for a face detector for detecting whether one or more facial images exist in each of subwindows having a set size while sequentially setting the subwindows in the width direction of an input image, wherein a scan interval between two neighboring subwindows under consideration in the width direction may be determined based on the facial color density of a first subwindow of the two neighboring subwindows.

Further, the subwindow setting method for a face detector may include a subwindow setting method for a face detector for sequentially setting subwindows having a set size in the width direction of an input image in a first row and then detecting whether one or more facial images exist in each of subwindows while sequentially setting the subwindows in a width direction in a second row, wherein a scan interval between the first and second rows in the height direction of the input image may be determined based on the facial color density of the subwindows included in the first row.

Further, the subwindow setting method for a face detector may include a subwindow setting method for a face detector for sequentially setting subwindows having a set size in the width direction of an input image in a first row and then detecting whether one or more facial images exist in each of subwindows while sequentially setting the subwindows in the width direction in a second row, wherein: a scan interval between two neighboring subwindows under consideration in the width direction in the first and second rows may be determined based on the facial color density of a first subwindow of the two neighboring subwindows; and a scan interval between the first and second rows in a height direction is determined based on the facial color density of the subwindows included in the first row.

BRIEF DESCRIPTION OF THE DRAWINGS

The above and other objects, features and other advantages will be more clearly understood from the following detailed description taken in conjunction with the accompanying drawings, in which:

FIG. 1 is a block diagram showing the configuration of a face detector using facial colors and Adaboost according to Korean Patent No. 755800;

FIG. 2 is a flowchart showing the operation of an image preprocessor shown in FIG. 1;

FIG. 3 is a flowchart showing the operation of a face detection unit shown in FIG. 1.

DETAILED DESCRIPTION

Figure 4A:
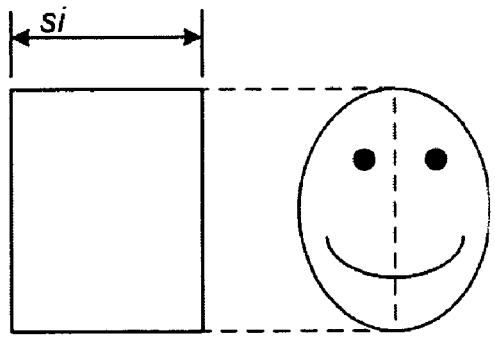
FIGS. 4A to 4D are views showing a subwindow setting method for a face detection unit according to an embodiment of the subject matter disclosed herein.

Reference now should be made to the drawings, in which the same reference numerals are used throughout the different drawings to designate the same or similar components.

FIGS. 4A to 4D are views showing a subwindow setting method for a face detection unit according to an embodiment of the subject matter disclosed herein. In FIGS. 4A to 4D, a subwindow indicated by a solid line is a current subwindow, and a subwindow indicated by a dotted line is a subsequent subwindow which is set by the method.

Figure 4B:
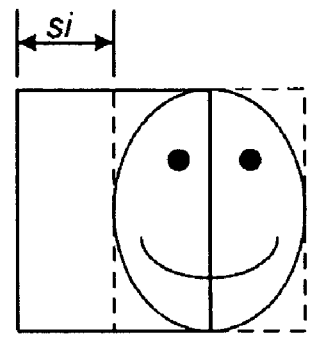
Figure 4C:
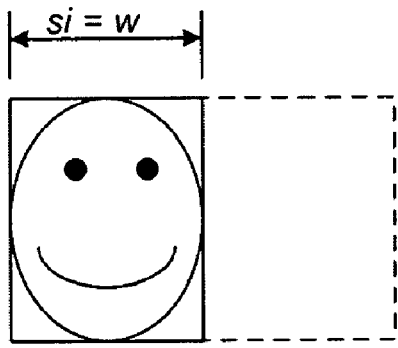
Figure 4D:
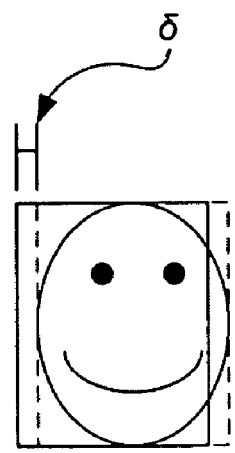

As shown in FIG. 4A, in the case in which the facial color density of a current subwindow is almost 0% and there is no possibility that the current subwindow corresponds to a face region, a subsequent subwindow is set such that it is spaced apart from the current subwindow by the width of the current subwindow. As shown in FIG. 4B, in the case in which the facial color density of a current subwindow is approximately 50%, a subsequent subwindow is set such that it is spaced apart from the current subwindow by the half of the width of the current subwindow. As shown in FIG. 4C, in the case in which a facial image is detected from a current subwindow, a subsequent subwindow is set such that it is spaced apart from the current subwindow by the width of the current subwindow. As shown in FIG. 4D, in the case in which the facial color density of a current subwindow is equal to or higher than a threshold but an entire facial image is not detected, a subsequent subwindow is set such that it is spaced apart from the current subwindow by a minimum scan interval δ.

Here, the interval between a current subwindow and a subsequent subwindow, that is, a scan interval 'si', is obtained using the facial color density 'density(win)' of a current subwindow 'win'. The facial color density 'density(win)' of the current subwindow 'win' can be obtained using Equation 3. Here, the coordinate of the upper left point of a subwindow is $(x_{tl}, y_{tl})$, and the coordinate of the lower right point is $(x_{br}, y_{br})$.

$$si = \begin{cases} \delta, & fn = 0, \text{density(win)} = 1 \\ \omega(1 - \text{density(win)}), & fn = 0, \text{density(win)} \langle 1 \\ \omega, & fn \rangle 0 \end{cases} \quad (4)$$

In the above Equation 4, 'δ' indicates a minimum scan interval (for example, one pixel), 'fn' indicates the number of facial images detected from the current subwindow, and 'δ' indicates the width of the current subwindow.

In the above Equation 4, although it is expressed that setting is made such that 'si=δ' if 'fn=0 and density(win)=1', the scan interval 'si' may be set to the minimum scan interval 'δ' if 'density(win)' is equal to or higher than an arbitrary threshold which is lower than 1, and the scan interval 'si' may be set to 'ω(1−density(win))' if 'density(win)' is lower than the threshold.

After all the subwindows for a single row are completely set using the method shown in FIGS. 4A to 4D, the corresponding row is moved to a subsequent row, and then subwindows are newly set. The scan interval '$si_h$' between the current row and the subsequent row is obtained using the following Equation 5:

$$Si_h = h \min_{win \in A} (1 - \text{density(win)}) \quad (5)$$

Where, 'h' is the height of the current subwindow and 'density(win)' is the facial color density of the current subwindow, and they can be obtained using Equation 3. 'A' is a row in which the current subwindow is included.

That is, for subwindows included in the current row, the value obtained by multiplying the minimum value of '1−density(win)' by the height of the current subwindow is set to the scan interval '$si_h$' of the height. Further, a subsequent row is set such that it is spaced apart from the current row by the scan interval '$si_h$' in the height direction.

The face detection unit sets subwindows using the above-described method, and then detects the existence of a facial image and a non-facial image for each of the set subwindows based on the operational flow shown in FIG. 3.

Since a subwindow is set such that it is spaced apart from the current subwindow by the width or height direction based on the facial color density of a currently set subwindow, it is possible to reduce excessive computational load for detecting face regions from an image.

There is an advantage in that face regions can be detected from an image using a small computational load, compared to the patent invention disclosed in Korean Patent No. 755800.

The system and method discussed above can be applied to all fields which require technologies for detecting facial images from input images. Technologies for detecting facial images from input images may be applied to various fields, for example, a user authentication system using face recognition, a security-related field, such as an intelligent video monitoring system for recording the entering and exiting of people, an intelligent robot having an ability to perform interchange with people, an intelligent home appliance, and an image detection field which scan images for people from images.

Although the descriptions herein have been disclosed for illustrative purposes, those skilled in the art will appreciate that various modifications, additions and substitutions are possible, without departing from the scope and spirit of the subject matter as disclosed in the accompanying claims.

What is claimed is:

1. A subwindow setting method for a face detector for detecting whether one or more facial images exist in each of subwindows having a set size while sequentially setting the subwindows in a width direction of an input image, wherein a scan interval between two neighboring subwindows under consideration in the width direction is determined based on facial color density of a first subwindow of the two neighboring subwindows.

2. The subwindow setting method as set forth in claim 1, wherein the scan interval between the two neighboring subwindows under consideration in the width direction is determined based on whether one or more facial images are detected from the first subwindow.

3. The subwindow setting method as set forth in claim 1, wherein, if the facial color density of the first subwindow is equal to or higher than a threshold, the scan interval between the two neighboring subwindows under consideration in the width direction is a minimum scan interval.

4. The subwindow setting method as set forth in claim 1, wherein, if the facial color density of the first subwindow is lower than a threshold, the scan interval between the two neighboring subwindows under consideration in the width direction is obtained by multiplying a length of a width of the first subwindow by (1—the facial color density of the first subwindow).

5. The subwindow setting method as set forth in claim 2, wherein, if one or more facial images are detected from the first subwindow, the scan interval between the two neighboring subwindows under consideration in the width direction is a length of a width of the first subwindow.

6. A subwindow setting method for a face detector for sequentially setting subwindows having a set size in a width direction of an input image in a first row and then detecting whether one or more facial images exist in each of subwindows while sequentially setting the subwindows in a width direction in a second row, wherein a scan interval between the first and second rows in a height direction of the input image is determined based on facial color density of the subwindows included in the first row.

7. The subwindow setting method as set forth in claim 6, wherein the scan interval between the first and second rows in the height direction is obtained by multiplying a minimum value of (1−the facial color density of each of the subwindows), included in the first row, by a height of the subwindows in the first row.

8. A subwindow setting method for a face detector for sequentially setting subwindows having a set size in a width direction of an input image in a first row and then detecting whether one or more facial images exist in each of subwindows while sequentially setting the subwindows in a width direction in a second row, wherein:
- a scan interval between two neighboring subwindows under consideration in the width direction in the first and second rows is determined based on facial color density of a first subwindow of the two neighboring subwindows; and
- a scan interval between the first and second rows in a height direction is determined based on facial color density of the subwindows included in the first row.

* * * * *